(12) United States Patent
Kochi et al.

(10) Patent No.: US 7,277,933 B2
(45) Date of Patent: Oct. 2, 2007

(54) SYSTEM FOR OPERATING A PLURALITY OF APPARATUSES BASED ON ACCUMULATED OPERATING TIMES THEREOF TO EQUALIZE THE RESPECTIVE OPERATING TIMES OF THE APPARATUSES

(75) Inventors: Kazutaka Kochi, Kawasaki (JP); Junichi Iizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 09/772,919

(22) Filed: Jan. 31, 2001

(65) Prior Publication Data

US 2002/0046270 A1    Apr. 18, 2002

(30) Foreign Application Priority Data

Aug. 28, 2000    (JP)    ............................. 2000-257527

(51) Int. Cl.
*G06F 15/16* (2006.01)
(52) U.S. Cl. ...................... 709/223; 709/203; 709/222; 709/224; 709/248; 714/1
(58) Field of Classification Search .......... 709/22–224, 709/248; 714/1
See application file for complete search history.

(56) References Cited

U.S. PATENT DOCUMENTS

| | | | | |
|---|---|---|---|---|
| 4,190,821 A | * | 2/1980 | Woodward ...................... | 714/4 |
| 5,774,660 A | * | 6/1998 | Brendel et al. ............. | 709/225 |
| 6,078,960 A | * | 6/2000 | Ballard ........................ | 709/229 |
| 6,105,053 A | * | 8/2000 | Kimmel et al. ............. | 718/105 |
| 6,128,279 A | * | 10/2000 | O'Neil et al. ................ | 370/229 |
| 6,223,205 B1 | * | 4/2001 | Harchol-Balter et al. ... | 718/105 |
| 6,438,563 B1 | * | 8/2002 | Kawagoe ..................... | 709/223 |
| 6,459,837 B1 | * | 10/2002 | Fitz et al. ................... | 385/113 |

(Continued)

FOREIGN PATENT DOCUMENTS

| | | |
|---|---|---|
| JP | 3-233751 | 10/1991 |
| JP | 5-113911 | 5/1993 |
| JP | 6-266634 | 9/1994 |
| JP | 9-44450 | 2/1997 |

OTHER PUBLICATIONS

Defintion of "round robin"—printed from http://www.webopedia.com.*

(Continued)

*Primary Examiner*—David Wiley
*Assistant Examiner*—Alina Boutah
(74) *Attorney, Agent, or Firm*—Staas & Halsey LLP

(57) ABSTRACT

An administrative server automatically manages the operating time of each of plural terminal equipments and promotes rotation between those having respective, longer and shorter operating times to thereby reduce the occurrence of trouble and improve operating efficiency. Respective operating times of a plurality of terminal equipments are measured and equalized at the expiry of a predetermined operation period tf. Rotation candidate terminal equipments are determined, based on their respective, accumulated operating times before the expiry of the predetermined operation period tx, and terminal equipments rotation messages are sent to the so determined rotation candidate terminal equipments. After an exchange of one of the rotation candidate terminal equipments with another, both are re-connected and the data associated with the one of the rotation candidate terminal equipments is downloaded onto the another rotation candidate terminal equipment. After the rotation is completed, operation of the respective terminal equipments resumes concurrently.

12 Claims, 6 Drawing Sheets

U.S. PATENT DOCUMENTS

| | | | | |
|---|---|---|---|---|
| 6,460,055 B1* | 10/2002 | Midgley et al. | ............ | 709/236 |
| 6,505,216 B1* | 1/2003 | Schutzman et al. | ......... | 707/204 |
| 6,523,030 B1* | 2/2003 | Horowitz | ....................... | 707/5 |
| 6,671,723 B2* | 12/2003 | Nguyen et al. | ............. | 709/224 |
| 6,725,253 B1* | 4/2004 | Okano et al. | ............... | 709/224 |
| 2004/0073675 A1* | 4/2004 | Honma et al. | .............. | 709/226 |
| 2004/0095237 A1* | 5/2004 | Chen et al. | ................. | 340/506 |

OTHER PUBLICATIONS

Microsoft Computer Dictionary Fifth Edition, definition of "load" and "round robin."*
Microsoft Computer Dictionary Fifth Edition, published in 2000, definition of "load" and "round robin" p. 315.*
Definition of "round robin"—printed from http://www.webopedia.com, printed Jan. 22, 2006.*

* cited by examiner

SYSTEM FOR OPERATING A PLURALITY OF APPARATUSES BASED ON ACCUMULATED OPERATING TIMES THEREOF TO EQUALIZE THE RESPECTIVE OPERATING TIMES OF THE APPARATUSES

BACKGROUND OF THE INVENTION

1. Field of the Invention

The present invention relates to a system for operating a plurality of personal computers (hereinafter, referred to as PCs) which are in a network environment, and more particularly to an operating system for suppressing the probability that failures are caused by equalizing the operating times of all the PCs involved.

2. Description of the Related Art

Conventionally, a plurality of PCs are connected to a network as multifunction online terminals and are administered in a centralized manner by an administrative server installed in the network.

However, when the online terminals are used as personal computers, the status where they are being so used is not linked with the administrative server, and therefore, it is not possible for the administrative server to detect the total time spent using the personal computer function on each PC.

To administer the total time spent using each PC, for example, time spent, purpose of the use and the like are entered in a recording form, and thus the manual management using a ledger has been carried out. A ledger management like this is dependent on individual users, and it is the individual users who report time they spent in using the PCs. Therefore, it is often the case with such a manually entered ledger based on the users' own reports that the entered operating time does not always coincide with the actual time they spent using the PCs, and thus it has always been difficult to detect accurately the time spent by the users.

In addition, the accumulation of actually spent time becomes troublesome with the time management using the manually entered ledger, and the accuracy of the management information so accumulated becomes unreliable, leading to a fact that it is not possible to detect accurately the actual utilization status of the PCs.

To cope with this, when a plurality of multifunctional terminal units connected to a network are used as personal computers, a data collecting unit provided within the terminal unit is designed to collect and accumulate the types of processing, time spent and the like and to send accumulated information to the administrative server, where the information sent from the PCs is collected and edited for centralized management (refer to Japanese Unexamined Patent Publication (Kokai) No. 3-233751).

Furthermore, in a case where a number of terminal units such as work stations are installed, execution time information on the whole processes except for the system process is automatically accumulated for each process unit within a certain time of time, and the accumulated execution time is then sent to a server or a center unit, whereby the actual operating status of the terminal units can be grasped, the operating efficiency of the integrated system being thereby improved (refer to Japanese Unexamined Patent Publication (Kokai) No. 5-113911).

On the other hand, in order to perform a total preventive maintenance management for a tremendous number of terminal units, the number of times a failure happened is stored and held, and maintenance people periodically patrol. During patrol the maintenance people verify the number of failures so held for each terminal unit and service the same.

In contrast to this, there is proposed a method in which failure detection information sent from a plurality of terminal units in a time series fashion is accumulated so as to predict the number of times a failure occurs on and the degree of emergency in maintenance of the terminal units, whereby the maintenance management of the plurality of terminal units are implemented (refer to Japanese Unexamined Patent Publication (Kokai) No. 6-266634).

Furthermore, as a countermeasures against the failure of a distributed processing information system there is proposed a method for multiplexing a system element which frequently fails, and this method provides two systems; a dual system in which other waiting systems are allowed to process the contents of a processing performed by normal processing systems at the same time, and a duplex system in which waiting systems perform processing separate from processing performed by normal processing systems and do processing of the contents of the normal processing systems instead thereof only when a failure occurs.

With these systems, the waiting systems have to have functions equal to those of the normal processing systems, and therefore, the systems have a drawback that the configuration of the waiting systems becomes expensive.

To this end, there has been proposed a duplex system in which failure countermeasures for the distributed processing information system can be realized at lower cost by providing a waiting system data base realizing means which is divided on a small scale within a client function means in the distributed processing information system (refer to Japanese Unexamined Patent Publication (Kokai) No. 9-44450).

With the aforesaid maintenance management systems, however, various types of information on time spent, failures and the like have to be detected and data so detected has be stored and held for each of the plurality of terminal units. This means that each terminal unit needs a device for acquiring such various types of information, this constituting a factor increasing the production cost.

Moreover, in order to realize a maintenance management like this in a system to which existing terminal units are connected, a new device has to be installed in each terminal unit for acquiring various types of information, and additionally, there may be occurring a case where it is difficult to take such countermeasures.

On the other hand, in recent years, as the model change interval of PCs which are used as terminal units has been getting shorter, in installation of PCs, there has been increasing a tendency that PC system operations are leased or rented. There is a demand that once installed, PC systems are operated with stable and less expensive cost while leased or rented. Under these environments, if a PC fails, the loss of data stored and time for an alternative operation is caused, and this reduces the operating efficiency and causes a problem with the utilization of the system. To eliminate such a risk, the failure of PCs must be suppressed to a minimum level and the running cost should be reduced.

The service lives of a general PC and a hard disk are said to be "five years based on eight hour operation per day" and "five years or twenty thousand hours whichever comes earlier," respectively. Statistically, the longer the operating time, the higher the failure rate, and with PCs having long operating time, failures tend to concentrate on specific PCs even before their operating times expire because the constituent components reach the end of their service lives.

In a situation in which a plurality of PCs are operated for the same time, the management of the operation of PCs has depended upon individual users. This creates a situation in which PCs having especially long operating time and PCs that have not been operated much are mixed together.

In these circumstances, failures tend to occur frequently on the PCs which the user has spent a long time using, whereas there occurs no failure on the PCs having short operating time, whereby an extremely inefficient system operation will be result.

An object of the present invention is to reduce the failure of PCs associated with the service lives thereof to thereby improve the operating efficiency by administering the operating times of the respective PCs with an administrative server and advising the users and administrator to rotate the PCs among those whose operating times differ.

SUMMARY OF THE INVENTION

With a view to solving the aforesaid problems, according to one aspect of the present invention, there is provided a terminal equipments (information apparatuses) operating system comprising a means for measuring operating time of each of a plurality of information apparatuses, a means for determining rotation candidates among the plurality of information apparatuses based on accumulated operating times of the information apparatuses with a view to equalizing the accumulated operating times of the respective information apparatuses and sending information apparatuses rotation messages to the rotation candidates, a means for backup processing data stored in the rotation candidate information apparatuses in accordance with the messages, and a means for downloading the data associated with one of the rotation candidate information apparatuses on another of the rotation candidate information apparatuses after the rotation between the one of the rotation candidate information apparatuses and the another of the rotation candidate information apparatuses one has been completed.

In addition, according to another aspect of the present invention, there is provided an administrative unit for managing a plurality of information apparatuses comprising a means for measuring the operating time of each of the plurality of information apparatuses and a means for determining rotation candidates among the plurality of information apparatuses based on accumulated operating times of the information apparatuses with a view to equalizing the accumulated operating times of the respective information apparatuses and notifying the rotation candidate information apparatuses to that effect, or a information apparatuses adapted to be connected to an administrative unit comprising a memory for storing data associated with the information apparatuses, a display means for displaying a terminal processing rotation message from the administrative unit, an input means for operating the information apparatuses in accordance with a direction of the message so displayed, and a control means for executing a backup process of the data stored in the memory on the administrative unit by performing a rotation operation in accordance with a direction of the message.

Furthermore, according the other aspect of the present invention, there is provided a computer readable recording medium having recorded therein a program for rendering a computer managing a plurality of information apparatuses execute measuring operating time of each of the plurality of information apparatuses, determining rotation candidate information apparatuses among the plurality of information apparatuses based on accumulated operating times of the information apparatuses with a view to equalizing the accumulated times of the respective information apparatuses and notifying the rotation candidate information apparatuses to that effect, and there is also provided a computer readable recording medium having recorded therein a program for rendering a computer connected to an administrative unit to receive a rotation message from the administrative unit and perform a backup process of data stored in the computer onto the administrative unit through rotating operation in accordance with a direction of the message.

DESCRIPTION OF THE PREFERRED EMBODIMENT

Referring to FIGS. 1 to 6, an embodiment of the present invention will be described.

Figure 1:
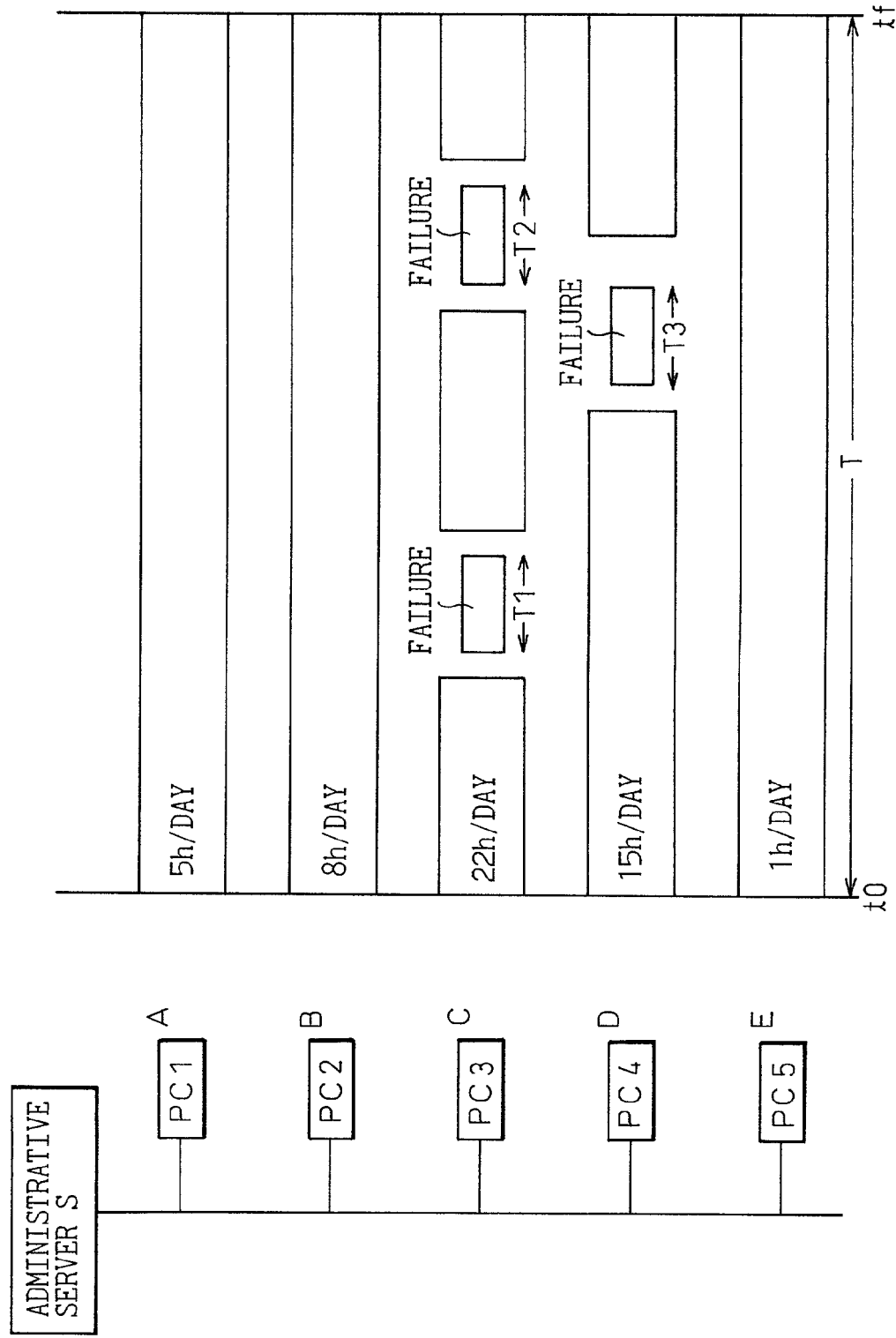
FIG. 1 is a diagram explaining a situation in which a plurality of PCs are used which are operated collectively.

Here, before the description of the embodiment according to the present invention is started, described, referring to FIG. 1, will be the operating status of each of a plurality of PCs which are to be operated for a certain time of time.

Personal computers PC1 to PC5 are operated for the same time of time during a leasing or renting time T. The plurality of personal computers PC1 to PC5 are connected to one another on a network and are managed by an administrative server S. t0 denotes the initiation time of the leasing or renting time when the operation of the personal computers is started, and tf denotes the expiry time of the leasing or renting time when the operation of the computers is completed.

Respective users of PC1 to PC5 are denoted by A to E, which correspond to PC1 to PC5, respectively, and the utilization status of the respective personal computers PC1 to PC5 by the corresponding users A to E is illustrated in a band graph.

For example, it is seen from the graph that the user A uses the PC1 at the rate of five hours per day, whereas the user C uses the PC3 at the rate of twenty-two hours per day. The longer utilization time per day means that the PC is operated too long and that the failure rate increases.

The utilization status shown in FIG. 1 indicates that the PC3 is exploited most severely with failures occurring at time frames T1 and T2. When PCs fail, in many cases hard disk drive, power supply, keyboard and the like fail. It is also seen that the PC3 was not in operation at the time frames T1 and T2 due to repairs. Although the user C has to use the PC3 very badly, he or she could not use it during those time frames. This causes a problem with the PCs' operation management.

It is also indicated that the PC4 used by the user D failed at a time frame T3, and this also causes a problem similar to that of the PC3.

On the contrary, the PC1 and PC5 used by the users A and E, respectively, are used less frequently, and hence their failure rate is low, and it is indicated that they would not fail until the leased or rented operation time expires at tf. This means that the PCs not used for long hours do not fail.

In a utilization status like this, there occurrs a difference in operating time among the PCs, and not only is the operating efficiency low but also alternative PCs need to be operated and hence a loss of time is caused.

To cope with this, in the embodiment of the present invention, instead of the individual users detecting the operating hours of their PCs on the ledgers, the administrative server is allowed to detect the accurate operating time of each PC without any change in configuration of the PCs. In addition, the administrative server is allowed to advise the users of a required rotation of their PCs based on the operating time accumulated for each PC so that the accumulated operating time averages among the PCs. Then, the users rotate their PCs when they receive messages advising them of required rotation.

Figure 2:
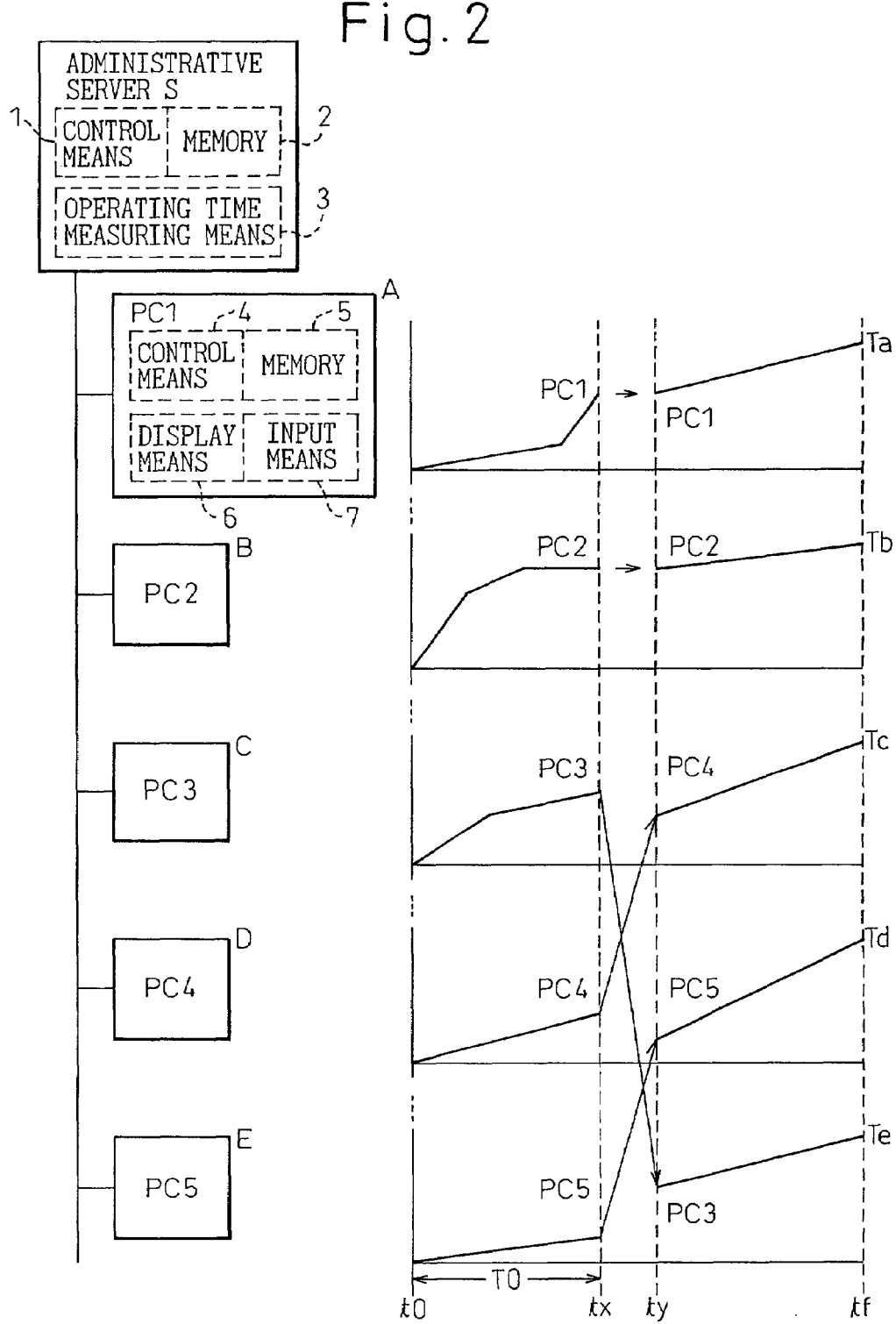
FIG. 2 is a diagram showing the transition of the accumulated operating times of the plurality of PCs and a rotation process.
Figure 3:
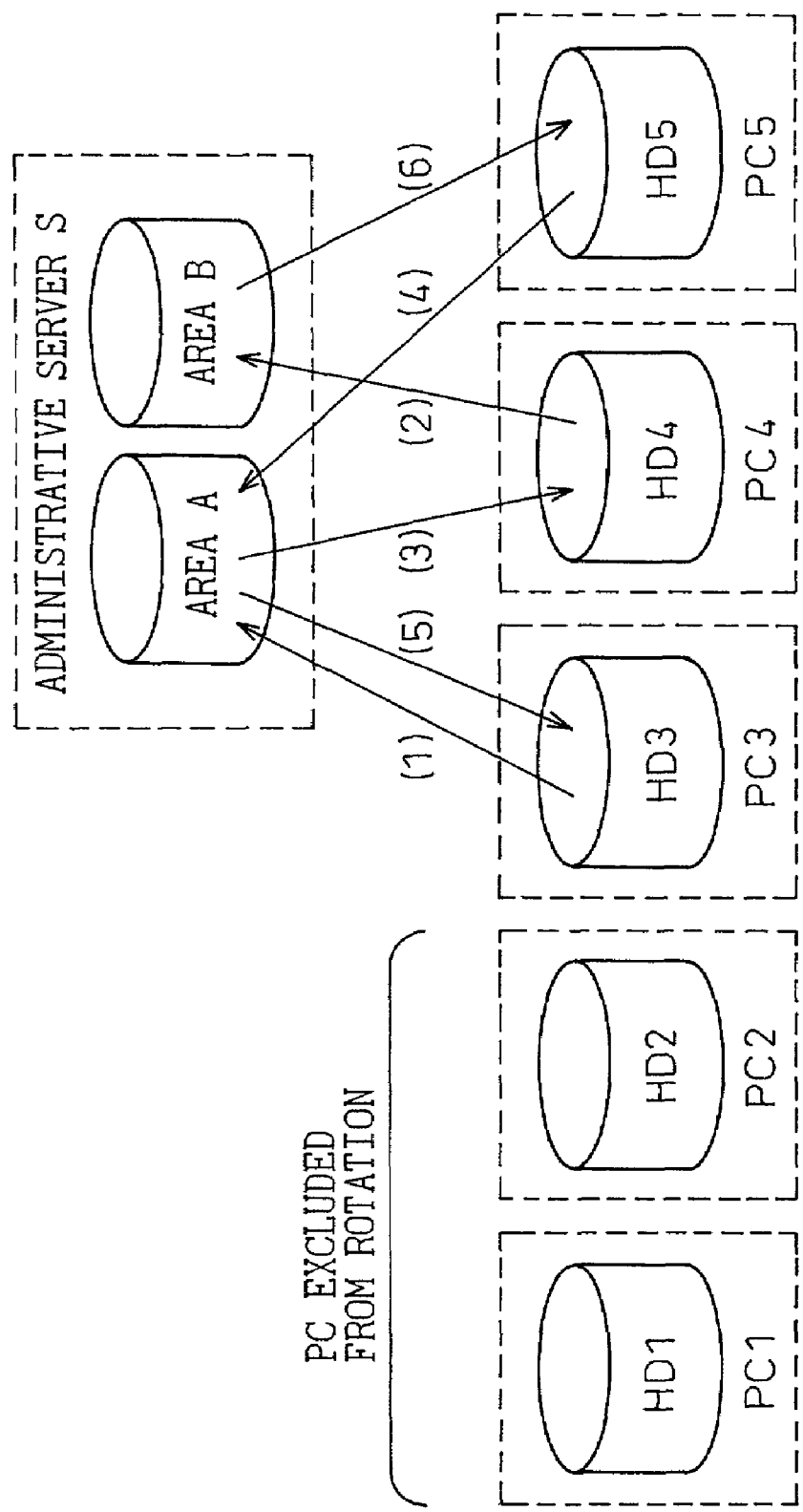
FIG. 3 is diagram showing backup processing of HDs of the PCs to be rotated.

FIG. 2 shows a schematic operating status of the PC 1 to PC5, representing a basic idea of the embodiment according to the present invention.

In FIG. 2, the connecting relationship between the administrative server S and PC1 to PC5 remains the same as that shown in FIG. 1 except that the administrative server S in FIG. 2 is provided with an operating time measuring means 3 in addition to a control means 1 including a CPU and a memory means 2. Each PC comprises a control means 4 including a CPU, a memory means 5, a display means 6 and an input means 7. Since the PC1 to PC5 are configured the same, in FIG. 2 the configuration of the PC1 will be described specifically, the description of the configurations of the remaining PCs being omitted.

Note that the administrative server S and the PC1 to PC5 adopt known computer hardware configurations.

Namely, the CPU which is a processing means, a main memory (RAM) which is a memory means and auxiliary memory units (various drives for reading information from a hard disk and various mobile media/writing information) are coupled together via a system bus. In addition, a display which is an display means and a keyboard and a mouse which are input means are also coupled to the system bus via their own interfaces as required.

Additionally, when realizing the present invention, the input means may comprise an input control function to inform the processing means of operations of the keyboard and the mouse, and the display means may comprise a display control function to have information displayed on the display, and the provision of those functions is not essential to the present invention.

Furthermore, in order to enable data communication with other computers via a network, a network control circuit which is a communication control means or a modem is also connected to the system bus. The transmission and receipt of information is conducted among the system constituent elements.

Moreover, in the computer, a program of the present invention stored in a memory medium is configured to be read out by the various drives, and the processing means is configured to control the system so as make it execute the processing according to the present invention. Note that the program of the present invention may be received from another computer and held.

Furthermore, in FIG. 2, the accumulated operating time of each PC measured since the initiation of the operation t0 by the operating time measuring means 3 of the administrative server S is shown in a graph. The axis of abscissa represents an leased or rented operating time time T from the initiation of the operation t0 to the expiry of the operation time, and the axis of ordinate represents the accumulated operating time of each PC.

The administrative server S determines combinations of candidates for rotation among the PC1 to PC5 at time tx after a certain time of time T0 has elapsed within the leased or rented operation time time T when the operating times of the respective PCs needs to be averaged based on their accumulated operating times during the certain time of time T0.

This decision is made through a statistical process at the control means 1 of the administrative server S, and the utilization tendency within the certain time time T0, the magnitude of the accumulated operation time at the time tx, a future utilization plan and the like are taken into consideration. For example, to look at the PC1, the accumulated operating time becomes long to some extent at the time tx. The utilization time drastically increases in the vicinity of the time tx, but the increase is judged as natural, and hence the user A is allowed to continue the PC1.

In addition, when looking at the PC2, the accumulated operating time becomes the longest at the time tx but it is not much used in the vicinity of the time tx. In this case, even in consideration of a future plant, the user B is also allowed to continue to use the current PC2.

Next, looking at the PC3, the accumulated operating time at the time tx becomes longer, and in the event that the user 3 continues to use the PC for a relatively long time in the future, since it is predicted that the accumulated operating time becomes tremendous during the leased or rented operating time time T, the user E is shifted to the PC3 who is expected to continue to spend less time using the PC. In addition, the user C is then shifted to use the PC4 which has enough operating time left at the time tx.

When looking at the PC5, since it has not been used much until the time tx, the user D is shifted to use the PC5 who is expected to use the PC very much in the future.

Thus, the rotation candidates among the PC1 to PC5 are determined based on the accumulated operating times thereof at the time tx. Therefore, it is predicted that the total accumulated operating times Ta, Tb, Tc, Td and Te of the respective PCs would average out substantially at the expiry tf of the leased or rented operating time time T. Note that the time T0 can be set several times before the operating time time T expires.

Then, the control means 1 of the administrative server S sends messages on a suggested rotation to the respective rotation candidate PCs so as to advise the corresponding users of the rotation. In accordance with the message displayed on their display means 6, the respective users switch the connections to the suggested PCs and start to use at the same time.

However, in switching the connections to the PCs, the data stored in the PCs they have used by then has to be secured. A procedure to be employed for this purpose will be described referring to FIG. 3.

The memory means 5 of the PC1 to PC5 are provided with hard disks HD1 to HD5, where the data stored by the PC rotation is preserved. Then, backup areas A and B are prepared in the memory means 2 of the administrative server S. As shown in FIG. 2, when the aforesaid respective PCs are rotated, the PC1 and PC2 are excluded from the rotation currently planned, and the rotation is to be carried out among the PC3 to PC5.

First, the whole preserved contents (for example, OS, application, user data) in the HD3 of the PC3 are preserved in the backup area A (1). Further, the whole preserved contents in the HD4 of the PC4 are preserved in the backup area B (2). Then, since the whole preserved contents in the HD4 of the PC4 are now backed up, the preserved contents in the HD4 are cleared and thereafter the preserved contents of the HD3 which are preserved in the backup area A are restored in the HD4 (3). Then, since the backup area A becomes vacant, the whole preserved contents in the HD5 of the PC5 are preserved in the backup area A (4). Following this, since the preserved contents of the HD3 is now preserved, the preserved contents in the HD3 are cleared and thereafter the whole contents of the HD5 which are now preserved in the backup area A are restored in the HD3 (5). Then, after the preserved contents in the HD5 are cleared, the whole contents of the HD4 which are preserved in the backup area B are restored in the HD5 (6).

Thus, in accordance with directions from the administrative server S which are displayed on the display means 6, the users carry out the rotation of the PCs in an interactive fashion by operating the input means 7 to the PCs they are using. Then, the whole preserved contents of the respective PCs are restored in the HDs of the PCs which the users are directed to use after a time ty, whereupon the respective PCs can be switched over.

A time tx to ty required for the rotation or switch-over is extremely short when compared with the repair time for repairing a failure, and thus the rotation can be completed within a very short time of time.

Figure 4:
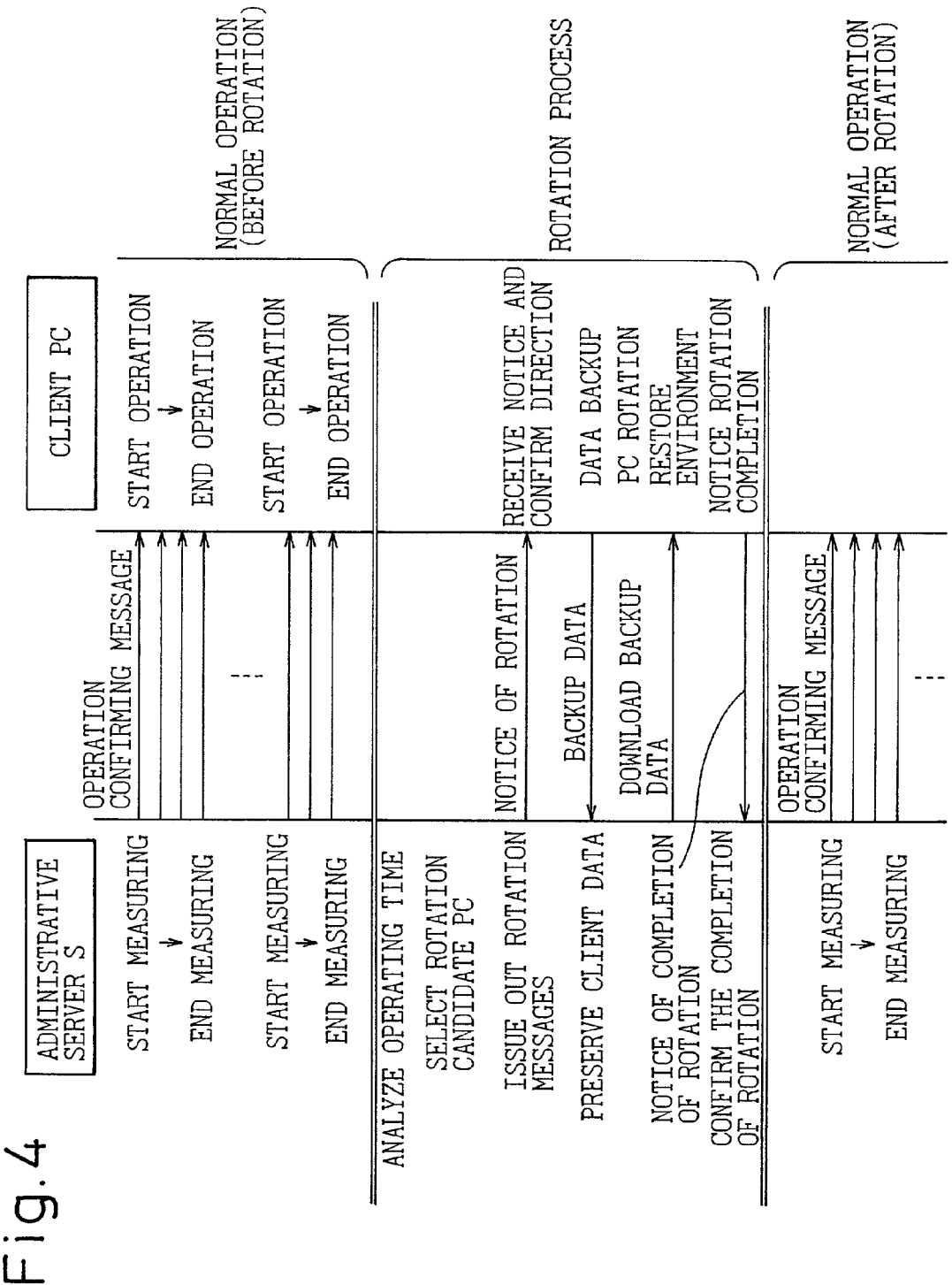
FIG. 4 is a time chart showing the transmissions and receipts of information between an administrative server and the PCs.

Next, referring to a time chart shown in FIG. 4, as shown in FIG. 2, the operations of the administrative server S and the PC1 to PC5 which are clients and are centrally controlled by the administrative server S when they are in normal operation, and are under rotational processing, will be described separately.

In the administrative server S, the operating time measuring means 3 measures the operating time of each of the PCs to be managed. The control means 1 of the administrative server S sends out messages confirming their operations to the respective PCs via the network and then receives replies to the messages from the respective PCs. Then, when receiving the messages, the control means 1 determines that the respective PCs which have replied are in operation and starts to measure the operating times thereof. On the contrary, when receiving no reply from the specific PC, then the control means 1 determines that the PC is not in operation and does not measure the operating time thereof.

Note that no special message needs to be prepared for confirmation of the PCs' operation, but any other message may do which indicates that the respective PCs reply and hence are in operation.

When they are in normal operation, for example, at the time T0 shown in FIG. 2, the administrative server S sends out operation confirming messages to the respective PCs sequentially. Then, if it receives replies to the messages from the respective PCs, the administrative sever S determines that the PCs which have replied are in operation and starts to measure the operating times thereof. The administrative server S carries out measuring the operating time for each PC and sends out operation confirming messages to the relevant PCs, and when it receives no reply from the specific PC, then the administrative server S determines that the specific PC is at a halt and stops measuring the operating time therefore.

Similarly, when receiving a reply to the message sent out from another specific PC, the administrative server S starts to measure the operating time thereof, and on the contrary, when receiving no replay from another specific PC, the administrative server S stops the measuring. Thus, the administrative server S measures the operating time, adds up the accumulated operating time for the respective PCs and keep them retained in the memory means 2.

Here, when the time T0 has elapsed, the administrative server S executes a rotation process. The administrative server S carries out an analyzing process so as to select the PCs to be rotated based on the accumulated operating times of the respective PCs at the time of lapse of the time T0.

Assuming that the accumulated operating times of the respective PCs are in the status shown in FIG. 2, the PC3 to PC5 are selected as rotation candidates. Then, the administrative server S issues rotation notice messages to the respective selected PCs. The message contains the accumulated operating time of the relevant PC and the tendency of operation thereof on top of the name of its rotation destination PC, and the needed information is designed to be displayed on the display means 6 of the relevant PC.

The users of the PCs advised as a rotation candidate preserve, in accordance with directions from the administrative server S, the whole contents preserved in the HDs of the memory means 5 of the relevant PCs into the backup areas prepared in the memory means 2 of the administrative server S. When confirming that the HD of the target PC which is a destination of the PC where the rotation originates is now vacant, the administrative server S downloads the whole contents of the rotation origin PC preserved in the backup area into the HD of the target PC.

Then, on the target PC side, the downloaded whole contents are restored. Thereafter, the rotations of the respective PCs are executed, and the respective candidate PCs send rotation completion notices to the administrative server S from the input means 7.

Receiving the rotation completion notices, the administrative server S confirms the completion of the planned rotations of the selected PCs and updates its administrative information. Then, the respective PCs are allowed to start the operation all together and the normal operation described above is resumed.

Figure 5:
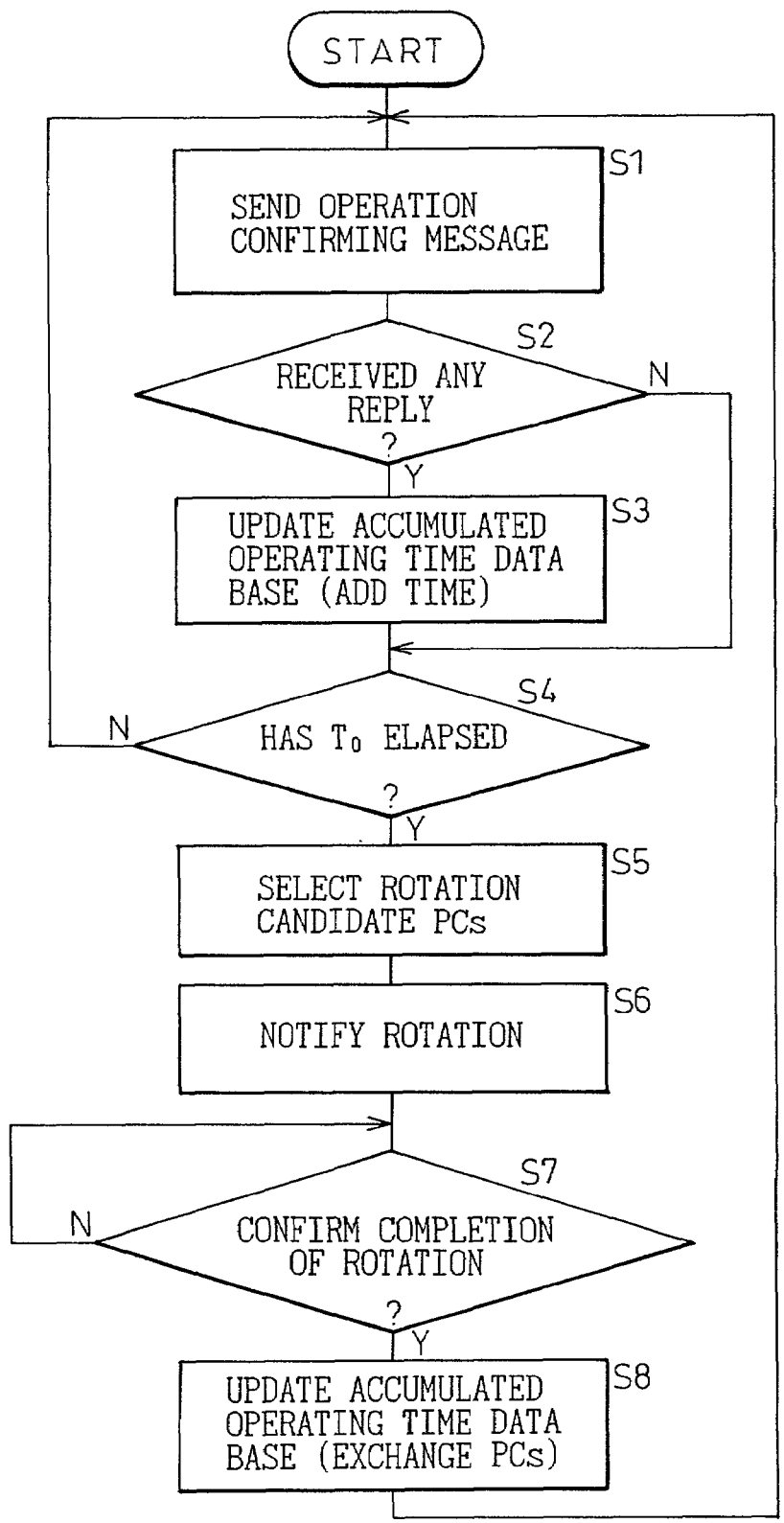
FIG. 5 shows a flow chart in the administrative server.
Figure 6:
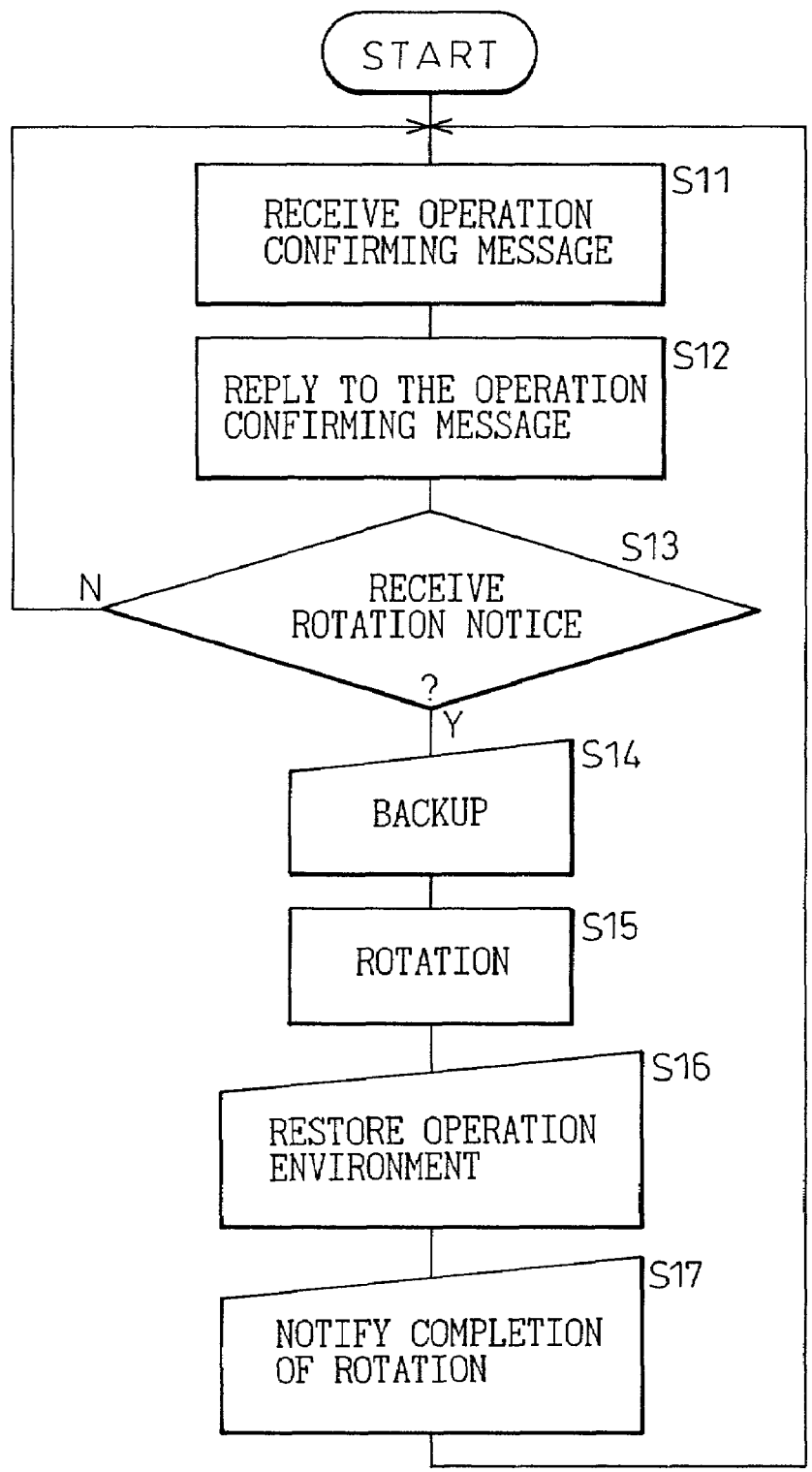
FIG. 6 shows a flow chart in the client side PCs.

While the operation of the administrative server and PCs have been described heretofore with reference to the time chart shown in FIG. 4, the operation of the administrative server S and the client side PCs will now be described with reference to FIGS. 5 and 6.

When the respective PCs are in normal operation, the administrative server S sends out operation confirming messages to the respective PCs via the network (step S1). When the operation confirming messages are sent out from the administrative server S to the respective PCs, the PCs receive the messages so sent (step S11).

When this happens, the PCs which are in operation sent back replies to the messages (step S12), but the PCs which are not in operation send back no reply.

The administrative server S verifies whether or not replies to the messages have been sent back thereto for the respective PCs (step S2).

Having received replies from the PCs in operation (Y), the administrative server S adds operating times of the respective operating PCs since the operation confirming messages were last issued till the current operation confirming messages have been issued (step S3). Thus, the accumulated operating times of the respective PCs can be obtained. Then, the administrative server S updates the data related to the accumulated operating times of the respective PCs.

On the contrary, in the event that no reply is sent back from the PCs which are not in operation (step S2, N), since there is no need to measure the operating times thereof, the process in step S3 is not carried out for the PCs which are not in operation.

The administrative server S continues to obtain the accumulated operating times for the respective PCs until a predetermined time T0 has elapsed and retains data so obtained (step S4). If the time T0 has not yet elapsed (N), the step S1 to step S3 are repeated.

Additionally, in the event that the time T0 has elapsed (Y), the administrative server S executes the analysis of the operating times of the respective PCs based on the accumulated operating times of the respective PCs that have been obtained by then. For example, as described with respect to FIG. 2, the PC3 to PC5 which need a rotation are selected out of the plurality of PCs (step S5).

Then, the administrative server S sends to the respective PCs notices that a rotation process is to start at the time tx and sends out rotation notice messages to the selected PC3 to PC5 (step S6).

The respective PCs on the client side receive the rotation process initiation notices from the administrative server S, and the selected PC3 to PC5 also receive the rotation notice messages (step S13). The PCs which receive no rotation notice messages and are left out of the rotation planned return to step S11, waiting until the next operation confirming messages are sent thereto from the administrative server S (N).

The PCs which have received the rotation notice messages from the administrative server S now acknowledge the receipt of the notice messages (Y) and display information required for the planned rotation in accordance with the contents of the messages so received. Then, following the procedure shown in FIG. 3, upon receipt of the information, the user of the relevant PC starts to execute, in accordance with the information, the transfer of the whole contents of the HD of his or her PC to the HD of the PC which is a destination of the rotation of his or her PC.

First, the whole contents residing in the HD of the relevant PC which is the origin of the rotation are backup preserved in the backup area of the administrative servers (step S14).

Next, after having received a notice that the backup preserving process has been completed on the target PC which is the destination of the rotation, the users of the rotation origin PC and the rotation target or destination PC exchange their PCs and connect the exchanged PCs back to the system (step S15).

Then, the user of the origin PC downloads the whole contents of his or her ex-PC which are stored in the backup area of the administrative server S onto the HD of the PC which has been exchanged with his or her ex-PC and which is now connected back to the system. Furthermore, the previous environment is then restored onto the exchanged PC (step S16).

The user who has successfully restored the previous environment on the exchanged PC sends a rotation completion notice to the administrative server S (step S17). Then, with this PC, the user returns to step S11, where waiting until the next operation confirming verification message is received.

On the other hand, the administrative server S waits until it receives rotation completion notices from all the rotation target PCs (step S7, N).

Then, when receiving the rotation completion notices from all the target PCs (Y), the administrative server S determines that the rotation process based on the accumulated operating times obtained during the time T0 has been completed and allows the respective PC to operate from a time ty all together. The administrative sever S resumes sending out operation confirming messages to the respective PCs until the following time t0 has elapsed and acquires the accumulated operating times for the respective PCs depending on replies therefrom (step S8).

Thus, the accumulated operating times of the respective PCs which resume their normal operation all together can be averaged, thereby making it possible to suppress the possibility that failures attributed to the excessive operating time concentrate on the specific PCs.

Note that in the embodiment, while the case has been described in which the PCs are rotated such that the accumulated operating times of the plurality of PCs become averaged at the expiry of the predetermined operation period such as the leasing or renting period, the PCs may be controlled such that the accumulated operating times of the respective PCs become averaged at the expiry of a predetermined operation period, as a result of the rotation of the respective PCs. For example, in a case where the predetermined period is a week, the PCs are rotated everyday such that the accumulated operating times thereof become averaged, and the accumulated operating times of the respective PCs become substantially averaged in a week's time. The everyday rotation of the PCs is carried out following a similar procedure to that used in the aforesaid embodiment.

According to the embodiment of the present invention, in a situation in which a plurality of PCs are operated for the same period of time as in the case with leased PCs, the management of the operating times of the PCs is automatically conducted by the administrative server instead of being carried out by the users or the administrator. Consequently, the man hours of the users or the administrator can be reduced, the improvement in serviceability and reduction in administrative cost being thereby expected.

In addition, the PCs having longer operating times and PCs having shorter operating times are periodically promoted to be rotated by managing the operating times of the PCs, whereby the operating times of the PCs can be averaged. By averaging out the operating times of the PCs a risk is suppressed that failures happen concentratedly on the PCs having longer operating times due to the service lives of the constituent devices before the lease period expires, whereby the efficient operation of all the PCs and reduction in maintenance cost can be expected.

Consequently, according to the present invention, since the operating times of a plurality of apparatuses can be automatically managed by the administrative server, the serviceability in operating the PCs can be improved. In addition, the rotation of the apparatuses having longer operation times and those having shorter operation times can be eased, whereby the operation times of the respective apparatuses can be averaged, thereby making it possible to avoid the generation of failures concentratedly on the specific apparatuses.

What is claimed is:

1. A system operating a plurality of information apparatuses, comprising:
   a measuring unit measuring operating time of each of a plurality of information apparatuses:
   a determining unit determining rotation candidates, among said plurality of information apparatuses, based on accumulated operating times of said respective information apparatuses with a view to equalizing the accumulated operating times of said respective information apparatuses and sending information apparatuses rotation messages to said rotation candidates;
   a backup unit backup processing data stored in said rotation candidate information apparatuses in accordance with said rotation messages; and a downloading unit for downloading said data associated with one of said rotation candidate information apparatuses on another of said rotation candidate information apparatuses after the rotation between said one of said rotation candidate information apparatuses and said another of said rotation candidate information apparatuses one has been completed.

2. The system operating a plurality of information apparatuses as set forth in claim 1, wherein said measuring unit measures the operating time of each of said information apparatuses which have replied to operating time confirming messages, sent thereto by said measuring unit, and holds a respective, accumulated operating time for each of said information apparatuses.

3. The system operating a plurality of information apparatuses as set forth in claim 1, further comprising:
a display unit displaying said rotation messages on said respective rotation candidate information apparatuses; and
a backup unit performing a backup process by transferring, in accordance with said displayed rotation message, said data stored in said one of said rotation candidate information apparatuses from said, one of said rotation candidate information apparatuses to another location.

4. An administrative unit for managing a plurality of information apparatuses comprising:
a memory having backup areas where stored data, stored in said respective information apparatuses, can be stored separately for each of said information apparatuses;
an operating time measuring unit measuring respective, accumulated operating times for said plurality of information apparatuses; and
a control unit determining rotation candidates, among said plurality of information apparatuses, with a view to equalizing the respective, accumulated operating times of said plurality of information apparatuses, directing said rotation candidate information apparatuses to perform a backup process of said stored data and further directing said respective information apparatuses to resume the operation thereof after the rotation of said rotation candidate information apparatuses has been completed.

5. An administrative unit as set forth in claim 4, wherein said operating time measuring unit confirms the receipt of replies to messages sent to said respective information apparatuses and then starts to measure the operating times of said respective information apparatuses.

6. An administrative unit as set forth in claim 4, wherein said control unit sends information apparatuses rotation messages to said rotation candidate information apparatuses, when said rotation candidate information apparatuses are determined, and directs said rotation candidate information apparatuses to display said messages.

7. An information apparatus adapted to be connected to an administrative unit, comprising:
a memory storing whole data relevant to operating environments associated with said information apparatus;
a display unit displaying an information apparatus rotation message from said administrative unit;
an input unit operating said information apparatus in accordance with a direction of said displayed rotation message; and
a controller unit executing a backup process of said data stored in said memory on said administrative unit by performing a rotation operation in accordance with a direction of said message.

8. The information apparatus as set forth in claim 7, wherein after having executed said backup process of said data stored in said memory on said administrative unit, said controller unit downloads whole contents, relevant to operating environments associated with another information apparatus which is backed up in said administrative unit on said memory.

9. The information apparatus as set forth in claim 7, wherein said control unit sends a reply message, indicating that said information apparatus is in operation, when said control means receives an operation confirming message.

10. An information apparatuses control method, comprising:
during a predetermined operation period for a plurality of information apparatuses, determining rotation candidate information apparatuses among said plurality of information apparatuses based on accumulated operating times of said respective information apparatuses with a view to equalizing the accumulated operating times of said respective information apparatuses;
performing a backup process of data associated with said rotation candidate information apparatuses; and
performing a download process of said data associated with one of said rotation candidate information apparatuses on another of said rotation candidate information apparatuses after the rotation between said one of said rotation candidate information apparatuses and said another of said rotation candidate information apparatuses has been completed.

11. A information apparatus control method, comprising:
when receiving replies from a plurality of information apparatus to operation confirming messages sent thereto, measuring operating time of each of said information apparatus from which said replies have been received and holding accumulated operating times of said respective information apparatuses;
determining rotation candidate information apparatuses among said plurality of information apparatuses based on the accumulated operating times with a view to equalizing the accumulated operating times of said respective information apparatuses;
sending information apparatuses rotation messages to said rotation candidate information apparatuses;
backup processing stored data of said rotation candidate information apparatuses in accordance with said messages;
downloading said data associated with one of said rotation candidate information apparatuses on another of said rotation candidate information apparatuses after the rotation between said one of said rotation candidate information apparatuses and said another of said rotation candidate information apparatuses has been completed; and
resuming the operation of said respective information apparatuses after the rotation among all said rotation candidate information apparatuses has been completed.

12. A information apparatus control method as set forth in claim 11, further comprising:
when information apparatuses rotation messages are sent to said rotation candidate information apparatuses, displaying said rotation messages on said rotation candidate information apparatuses; and
performing in accordance with said displayed message a backup process by transferring said stored data of said rotation candidate information apparatuses from said rotation candidate information apparatuses to another location.

* * * * *

UNITED STATES PATENT AND TRADEMARK OFFICE
CERTIFICATE OF CORRECTION

PATENT NO. : 7,277,933 B2  Page 1 of 1
APPLICATION NO. : 09/772919
DATED : October 2, 2007
INVENTOR(S) : Kazutaka Kochi et al.

It is certified that error appears in the above-identified patent and that said Letters Patent is hereby corrected as shown below:

Title Page, Column 2 (Other Publications), Line 1, change "Defintion" to --Definition--.

Signed and Sealed this

Fifteenth Day of April, 2008

JON W. DUDAS
*Director of the United States Patent and Trademark Office*